(12) United States Patent
Eickemeyer et al.

(10) Patent No.: US 6,336,160 B1
(45) Date of Patent: Jan. 1, 2002

(54) METHOD AND SYSTEM FOR DIVIDING A COMPUTER PROCESSOR REGISTER INTO SECTORS AND STORING FREQUENTLY USED VALUES THEREIN

(75) Inventors: Richard James Eickemeyer, Rochester, MN (US); Nadeem Malik, Austin, TX (US); Alan Vicha Pita, Austin, TX (US); Avijit Saha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/100,717

(22) Filed: Jun. 19, 1998

(51) Int. Cl.[7] .......................... G06F 13/00; G06F 12/04; G06F 9/30
(52) U.S. Cl. .......................... 711/1; 711/118; 711/173; 712/23; 712/217
(58) Field of Search .............................. 711/118, 1, 205, 711/206, 207, 170, 209, 173, 208, 221, 202, 171, 153; 712/210, 216, 217, 23

(56) References Cited

U.S. PATENT DOCUMENTS

| | | | |
|---|---|---|---|
| 5,497,499 A | 3/1996 | Garg et al. | 712/217 |
| 5,519,841 A | 5/1996 | Sager et al. | 711/202 |
| 5,524,262 A | 6/1996 | Colwell et al. | 712/23 |
| 5,548,776 A | 8/1996 | Colwell et al. | 712/217 |
| 5,560,032 A | 9/1996 | Nguyen et al. | 712/23 |
| 5,574,928 A | 11/1996 | White et al. | 712/23 |
| 5,581,717 A | 12/1996 | Boggs et al. | 712/208 |
| 5,590,295 A | 12/1996 | Deosaran et al. | 712/217 |
| 5,590,352 A | 12/1996 | Zuraski et al. | 712/23 |
| 5,596,731 A | 1/1997 | Martinez et al. | 710/129 |
| 5,600,848 A | 2/1997 | Sproull et al. | 712/42 |
| 5,611,071 A * | 3/1997 | Martinez, Jr. | 711/133 |
| 5,613,151 A * | 3/1997 | Dockser | 711/202 |
| 5,630,149 A * | 5/1997 | Bluhm | 712/217 |
| 5,652,774 A * | 7/1997 | Eickemeyer et al. | 712/217 |
| 5,826,070 A * | 10/1998 | Olson et al. | 712/222 |
| 5,897,665 A * | 4/1999 | Padwekar | 711/212 |
| 5,946,716 A * | 8/1999 | Karp et al. | 711/207 |
| 5,946,718 A * | 8/1999 | Green | 711/207 |

* cited by examiner

Primary Examiner—Glenn Gossage
(74) Attorney, Agent, or Firm—Volel Emile; Edmond A. DeFrank

(57) ABSTRACT

A method and system for dividing computer processor registers into sectors and storing frequently used data in the most significant unused sectors. The method includes sector renaming that is performed on each individual sector (i.e., on a sector-by-sector basis) rather than renaming an entire processor register. A register is divided into sectors such that the smallest accessible unit for an instruction in each register can be uniquely addressed and renamed. A register file is divided into sectors so that each process register can be uniquely addressed and renamed. The most significant sectors of the processor registers are used to hold pre-assigned values therein. Data previously loaded into processor register sectors is stored in the most significant sectors of the processor registers for possible future referencing and use. The method also includes establishing a sign-extend memory that includes at least one sign-extend bit in a sector status table.

7 Claims, 6 Drawing Sheets

METHOD AND SYSTEM FOR DIVIDING A COMPUTER PROCESSOR REGISTER INTO SECTORS AND STORING FREQUENTLY USED VALUES THEREIN

RELATED APPLICATIONS

The present application is related to co-pending application entitled "METHOD AND SYSTEM FOR DIVIDING A COMPUTER PROCESS REGISTER INTO SECTORS", Ser. No. 09/100,718, filed on Jun. 19, 1998 and assigned to the assignee of the present application.

FIELD OF THE INVENTION

The present invention relates generally to information handling systems and more particularly to an improved methodology for referencing information in registers of computer processing units.

BACKGROUND OF THE INVENTION

High performance superscalar computer processors use a technique known as "register renaming"to facilitate out-of-order instruction execution. In general, register renaming refers to a method by which a specific processor register may be used by multiple instructions without conflict. For example, if an instruction requires the use of a specific register, and a second instruction also requires the use of that same register while the register is still being used by the first instruction, the processor will redefine one of its unused registers as a second copy of the specific register, and the processor will track and manage the specific register and the renamed register relative to the information contained in the registers and the associated instructions.

Register renaming can also be used to redirect data held over in a rename register from the execution of a previous instruction for use by a subsequent instruction. However, such reuse of data values in rename registers is practically not achievable because rename registers get written over by new data values before the older values can be reused. Processors only have a very limited number of rename registers and adding too many such registers have other implementation performance-limiting aspects.

To date, processors have implemented register addressing on a whole unit basis. That is, register renaming is done by assigning an alias code to each operand on the basis of the register identifier and without regard to the portion of the bits of that register which are actually accessed by the instruction. This practice results in a waste of precious register bits.

As another consequence of implementing register addressing on a full register basis, if an instruction needs to access data bits in a register that are not aligned at the starting bit position of a register, such data has to be re-fetched from memory, hence, resulting in unnecessary performance degradation. For example, a typical RISC (Reduced Instruction Set Computer) processor, such as the PowerPC processor, was introduced as a 32-bit architecture and later extended to 64-bits. Existing applications written for the 32-bit processors must still run on the 64-bit processors. When the processor hardware assigns the architectural registers or the renamed registers to instructions, all the 64 register bits are used as a whole entity. However, half of the register bits are wasted when running 32-bit programs. In fact, the upper 32 bits of the register are left unused in many cases even in the 64-bit mode. The current processor design does not allow the upper and lower 32-bit halves of the 64-bit register to be equally accessible, which results in a waste of critical register bits.

Accordingly, there is a need for an enhanced method and processing apparatus which is able to provide increased register efficiencies and improved processor performance.

SUMMARY OF THE INVENTION

A method and apparatus is provided for sectoring processor registers and utilizing the most significant unused sectors of the processor registers to hold frequently used data. Since most register data values do not utilize the most significant bits of a register value, these most significant bits grouped as sectors can be utilized to provide enhanced performance resulting from data buffering. Unused register sectors are used to hold frequently used data or sequentially adjacent data to exploit spatial locality, thus, saving processor cycles to fetch data from the processor memory. In one embodiment, the register file is divided into sectors such that the smallest accessible unit for an instruction set in each register can be uniquely addressed and renamed. The most significant sectors of the registers, if not marked to be in use, are used for holding pre-assigned constant values, such as "0", "1", or other frequently used constant offsets, etc. In another embodiment, the previous data loaded into register sectors is saved in most significant register sectors for future possible reference by subsequent instructions.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
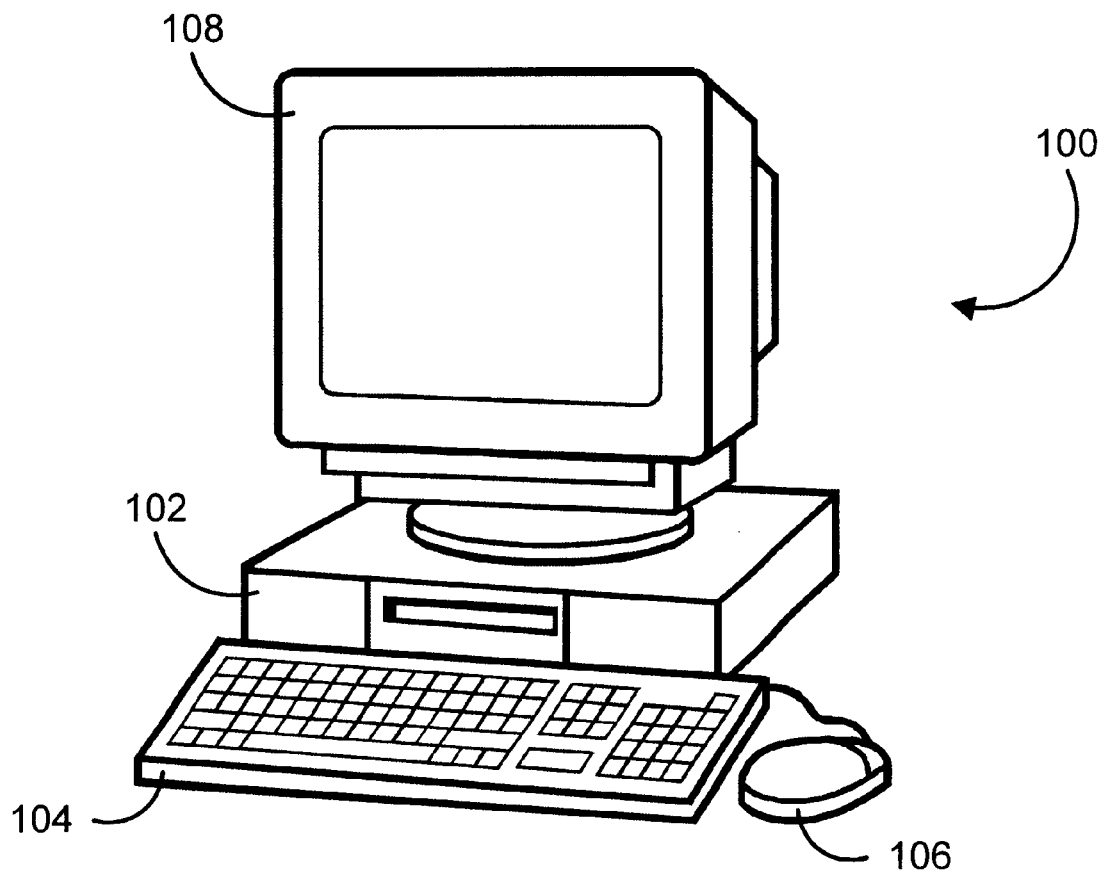
FIG. 1 is a diagram of a partial simplified exemplary computer system in which the present invention may be implemented.

In order to further illustrate the disclosed methodology, reference is made to the attached drawings in which FIG. 1 presents a portion of an exemplary computer system in which the present invention may be implemented. As shown, a computer station 100 includes a CPU (central processing unit) enclosure 102 that typically encloses much of the electronics of the system. Also illustrated is a keyboard 104 and a pointing device or "mouse" 106. The keyboard 104 and mouse 106 are arranged to receive inputs to the system from an operator. These operator inputs may be responsive to programmed presentations appearing on a display device 108. The display device 108 is shown as a cathode ray tube (CRT) in the present example although other display devices such as liquid crystal displays (LCDs) or active matrix displays typically used with portable systems may also be implemented. The present invention may be used in desktop, laptop, workstation or larger systems as well.

Figure 2:
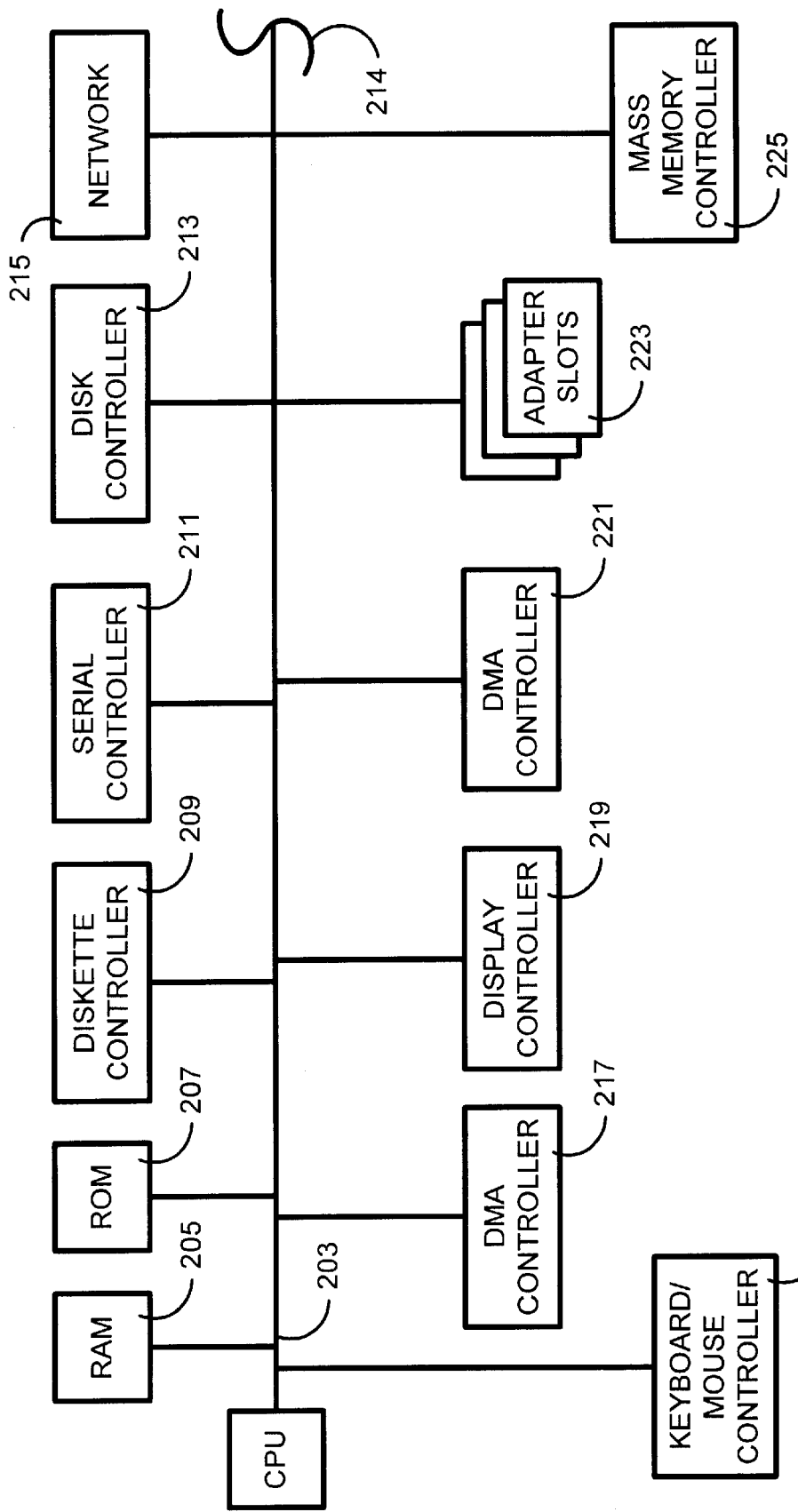
FIG. 2 is a high level block diagram showing selected components and subsystems within the exemplary system illustrated in FIG. 1.

In FIG. 2, a CPU chip or integrated circuit 201 is shown connected to a main bus 203. For the sake of simplicity and in order not to unduly obfuscate the teachings disclosed herein, the example presented shows only a single bus although it is understood that the implementing system may include a plurality of busses and connecting bridge circuits and networks. As illustrated, a RAM (random access memory) unit 205 and a ROM (read only memory) unit 207 are connected to the bus 203. The bus 203 is also coupled to various system controllers including a diskette controller 209 for controlling one or more floppy diskettes, a serial controller 211 typically used in communication functions, and a disk controller 213 for controlling one or more hard drive devices. A network interface 215 is also illustrated as being connected to the bus 203. The network interface 215 may couple the system shown to a hardwired network or through a modem to a more extensive network such as the Internet. Further the bus 203 may be extended as shown by line 214 to include other connections to even more system devices and functional subsystems.

The bus 203 is also arranged for connection to a keyboard/mouse controller 216, a DMA (direct memory access) controller 217, a display controller 219 for interfacing with one or more display devices, and a parallel controller 221 typically used for connection to one or more printer devices. In addition, the bus 203 may include adapter slots 223 for being coupled with adapter devices, and a mass memory controller 225 for use in controlling mass memory that may be, for example compact disc, read-only memory (CD-ROM) or other large scale memory devices. CPU 201 fetches, decodes and executes instructions and transfers information to and from other system resources, such as system RAM 205, controller 209, etc., which are coupled to the system bus 203 or coupled through corresponding bus systems in more extensive arrangements.

Figure 3:
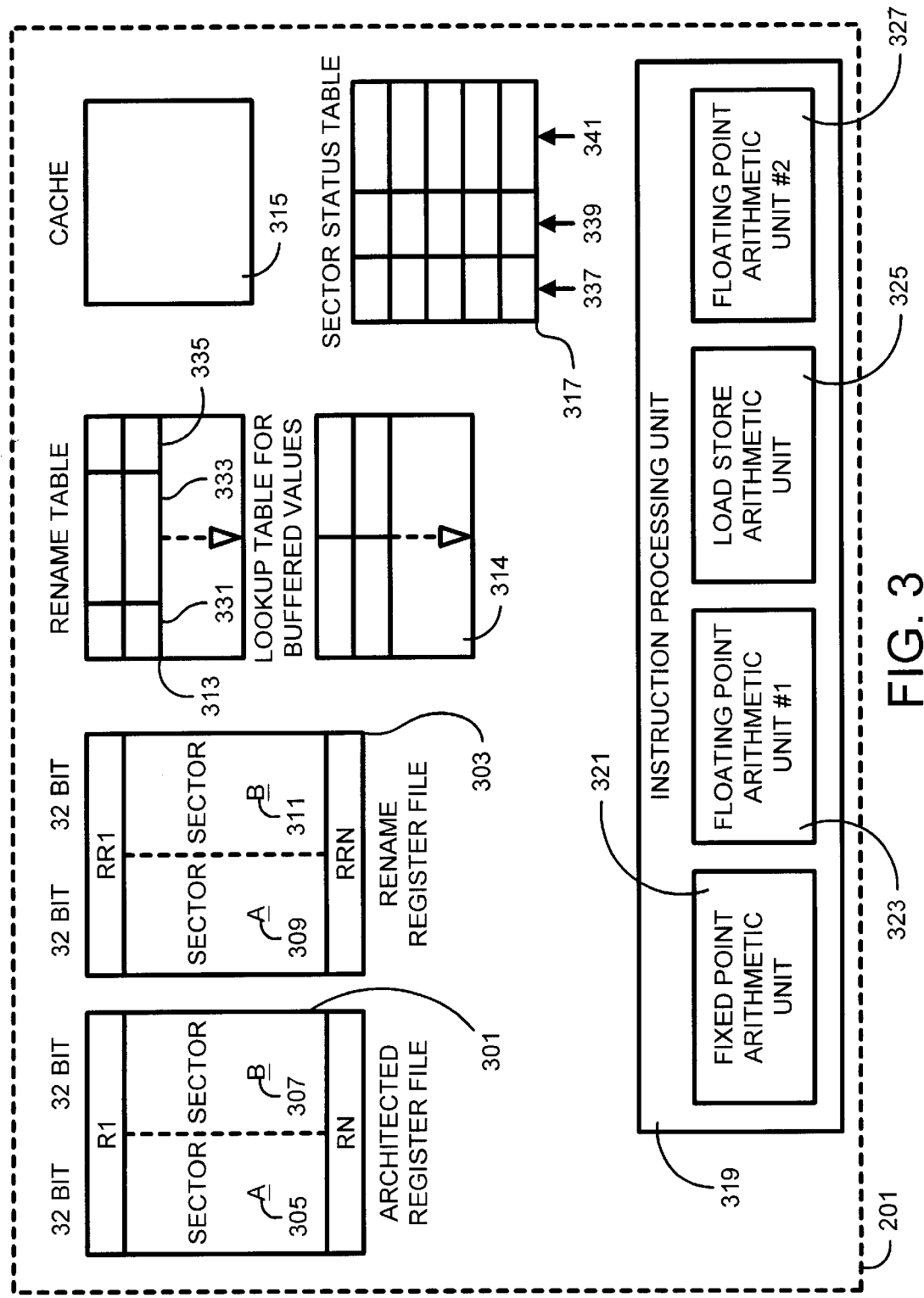
FIG. 3 is a block diagram illustrating in greater detail selected components within the central processing unit (CPU) of FIG. 2.

In FIG. 3, selected components of the CPU unit 201 are illustrated in greater detail. The CPU 201 includes an Architected Register File (ARF) 301, which is 64 bits wide in the present example although other sizes may also be implemented. The ARF 301 is further divided into two 32-bit sectors designated Sector A 305 and Sector B 307. As shown, the registers are divided into only two 32-bit sectors although smaller sectors are also possible. The individual registers in the register file 301 are designated "R1" through "RN". Similarly, the CPU 201 further includes a second register file designated the Rename Register File (RRF) 303. The RRF 303 is also divided into two 32-bit sectors designated Sector A 309 and Sector B 311. As shown, the registers are divided into only two 32-bit sectors although smaller sectors are also possible. The individual registers in the RRF 303 are designated "RR1" through "RRN".

Each sector A 309 and sector B 311 provides an independent 32-bit rename register as shown, such as RR1A and RR1B.

The CPU also includes a Rename Table 313, a Look-Up Table for Buffered Values 314, a cache memory 315, and a Sector Status Table 317. An Instruction Processing Unit 319 is also illustrated. The Instruction Processing Unit 319 includes a Fixed Point Arithmetic Unit 321, a Floating Point Arithmetic Unit #1 323, a Load Store Arithmetic Unit 325 and a Floating Point Arithmetic Unit #2 327, in the present example. The use and implementation of the ARF 301, internal cache 315, and Instruction Processing Unit 319 are well known in the art. The RRF 303 has typically been used for allowing the CPU 201 to execute instructions in a non-sequential fashion, often referred to as "out-of-order", via the use of additional registers contained therein. A typical operation of circuitry similar to that illustrated in FIG. 3 is explained in greater detail in U.S. Pat. No. 5,652,774, which is assigned to the assignee of the present invention and which is included herein by reference. In the present example, however, the ARF 301 and the RRF 303 are divided into two 32-bit sectors and the CPU further includes a Rename Table 313 and a Sector Status Table 317.

An exemplary implementation of the register renaming methodology disclosed herein consists of an architecture that uses 64-bit registers. In this exemplary method for sector renaming, the register is renamed on a sector by sector basis instead of on a full register level. Status bits are associated with each 32-bit halves or sectors of the register. The status indicates whether the sector has been modified, or is not changed by a particular instruction. When manipulating entire registers, all sectors are marked with the same status and the hardware operates in the usual manner. When sectors are manipulated, it is clear from the sector status bit or bits, which parts are modified and which are not. If the entire register is modified by an instruction, two rename registers are used. If the instruction modifies only one sector, then only one rename register is used.

The renaming register pool, i.e. the group of registers available for renaming, consists of a number of 32-bit registers. These rename registers are used independently for each 32-bit register sector that needs to be renamed. This pool consists of the A sector 309 and the B sector 311 in RRF 303, and the A sector 305 sector in ARF 301.

The processor's 64-bit registers are divided into two sectors, each most significant (left half) and the least significant (right-half) sector can be considered as an independent register if all the register bits are not in use by the instructions. The most significant unused sectors can now be preset to constant values, such as "0", "1", "−1", "4", "16", etc., which are some of the constant data values that are frequently loaded into registers to perform array index operations, zero memory locations, increment counts, etc. In this example, if an instruction is sent to the processor for execution that requires any such preset values to be loaded from memory, the processor hardware will detect that the required value is already in a register sector. In that case, the processor circuitry will nullify that instruction and rename the subsequent instruction that uses the target register to the sector that is found to have that constant value. This saves an instruction from being executed and helps avoid a performance limiting memory reference for the data as well.

In a second exemplary method, most significant sectors that are not marked as used are utilized to hold previously fetched data values that are to be overwritten by a subsequent instruction that requires a previously used register as its target register. Since, architecturally, there are only a finite number of registers, compilers reuse registers and, hence, overwrite a data value even though it may be referenced later. However, in the exemplary method illustrated here, whenever the old data value is to be overwritten, it is moved into the most significant sector of that register. If later a processor is sent an instruction to reload a data value that already exists in a sector, that instruction is nullified and the sector is renamed to the register that would have been the target of the nullified instruction. This again saves an instruction from being executed and helps avoid a performance limiting memory reference for the data as well.

The "A" sector or the most significant sector of the ARF 301 is the only sector available for renaming from the architected registers, i.e. the least significant sector 305 of the register 301 is not used for renaming. The first column 331 in the Rename Table 313 contains the architected register number, the second column 333 contains the instruction address and the third column 335 contains the architected register or rename register number plus the sector mask. There is one sector mask bit for each sector. In the Sector Status Table 317, there is one entry per register. The first column 337 of the Sector Status Table 317 contains the sign extend bit, the second column 339 contains the sector use bits (of which there is one bit for each sector), and the third column 341 contains the register number. The look-up table 314 is an associative table that provides a relation between an effective address and the register sector buffering the data value of that effective address.

Figure 4:
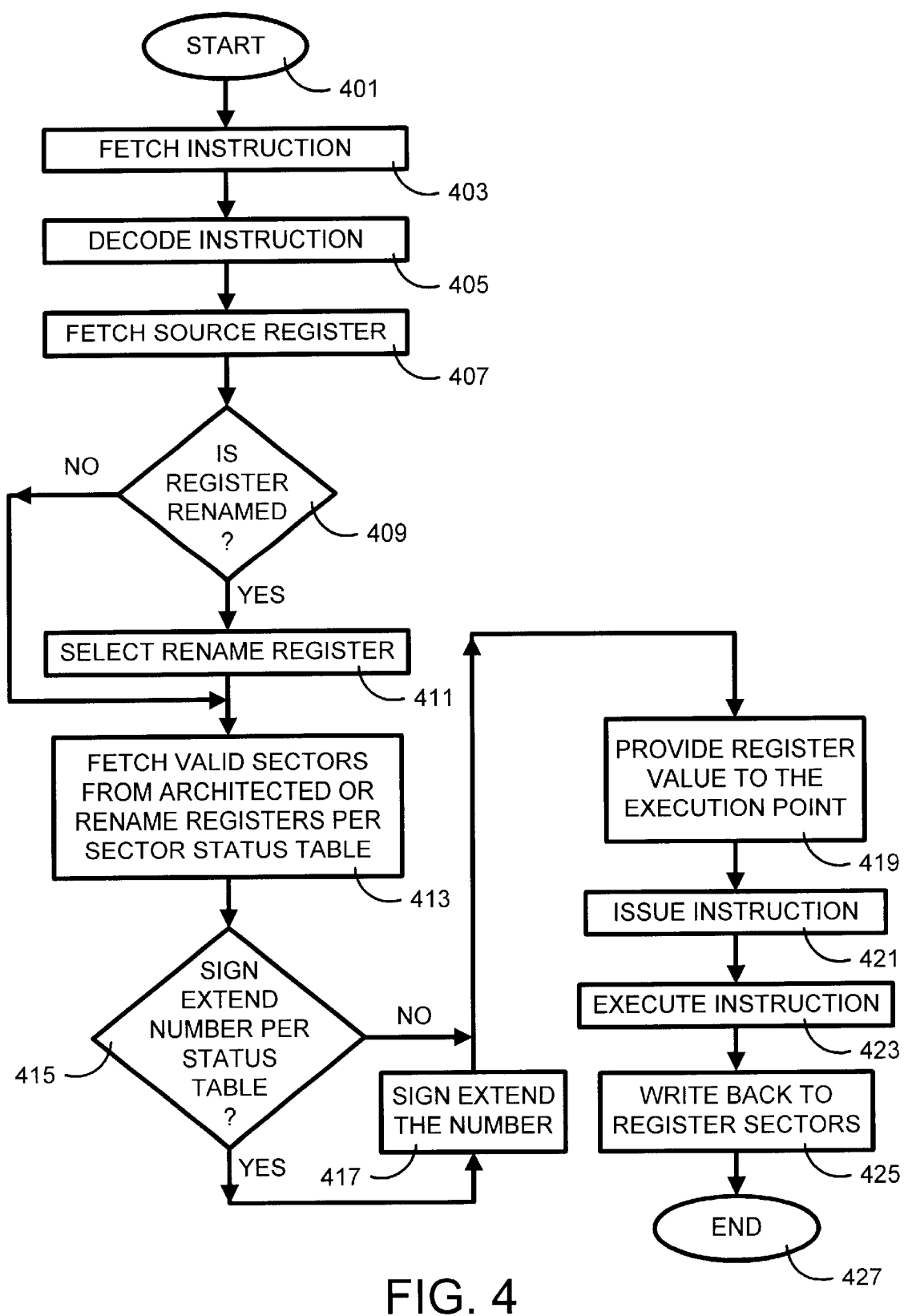
FIG. 4 is a flowchart illustrating an operational sequence for a register used as a source register in the processing of an instruction.

FIG. 4 is a flowchart illustrating an operational sequence for a register used as a source register in the processing of an instruction. In FIG. 4, when the process begins (oval 401), an instruction is fetched (box 403) and decoded (box 405). The source register is then fetched (box 407) and a decision is made to determine if the register number has been renamed (diamond 409). This decision is made by determining whether the register number is listed in the rename table 313 and the current instruction address is greater than the address in the rename table. If not, the process continues by fetching (box 413) valid sectors from the architected registers in ARF 301 or renamed registers in RRF 303 in accordance with the Sector Status Table 317. If the source register was renamed (diamond 409) then the process selects the rename register (box 411) and then proceeds to fetching the valid sectors (box 413). Next, a determination is made (diamond 415) as to whether to sign-extend the number 337 as determined from the Sector Status Table 317. In not, a register value is provided (box 419) to the execution unit (not shown) in the CPU 201. If the number is to be sign-extended (box 417) per the Sector Status Table 317, then the number is sign-extended prior to providing the register value to the execution unit. Next the instruction is issued (box 421), executed (box 423) and the result is written back to the register sectors (box 425) as the process ends (oval 427).

Figure 5:
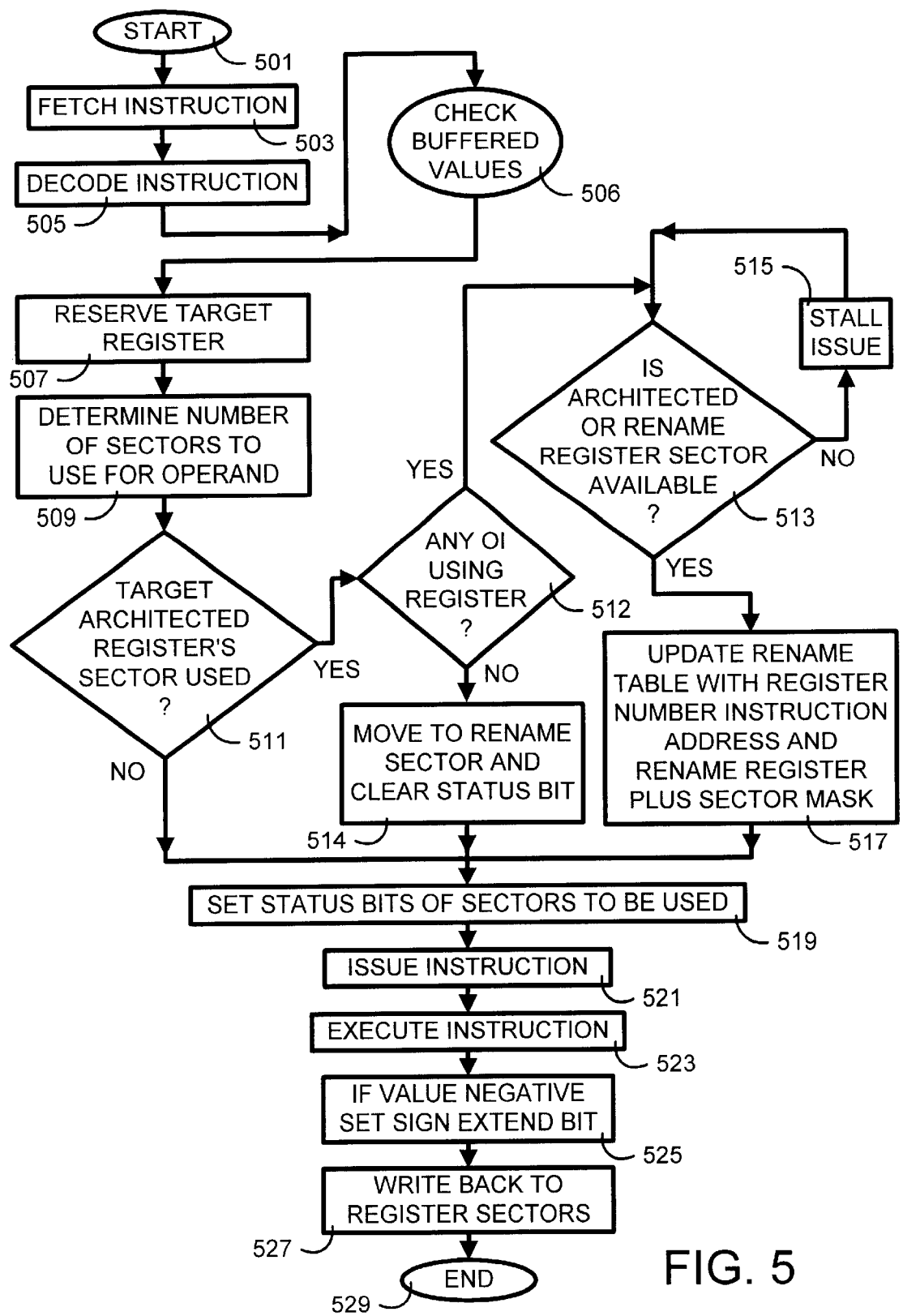
FIG. 5 is a flowchart illustrating an operational sequence for a register used as a target register in the processing of an instruction.
Figure 6:
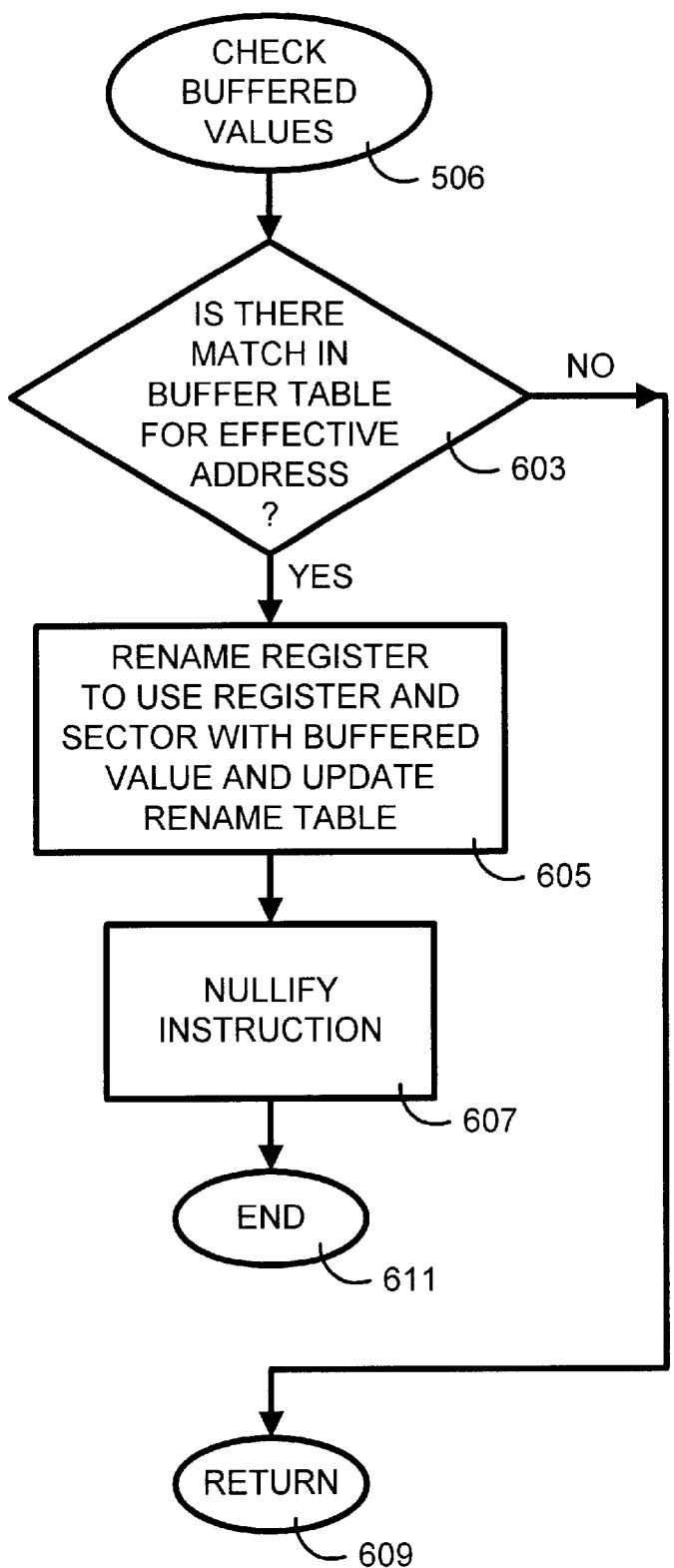
FIG. 6 is a flowchart illustrating in more detail the operational sequence for determining buffered value matches shown in FIG. 5.

FIG. 5 is a flowchart illustrating an operational sequence for a register used as a target register in the processing of an instruction. As the process is initiated (oval 501), an instruction is fetched (box 503), and decoded (box 505). FIG. 6 is a flowchart illustrating in more detail the operational sequence for determining buffered value matches shown in FIG. 5. Referring to FIGS. 5 and 6, next a check is made of the Look-Up Table (oval 506) for Buffered Values 314 to determine is there is a match (diamond 603) in the buffer table for the effective address. If there is a match, the rename register will use (box 605) the register and sector with the buffered value, and the rename table will be updated. Next the instruction will be nullified (box 607) and the process ends (oval 61 1). If there is no match (diamond 603) the process returns (oval 609) to the flow illustrated in FIG. 5.

Referring back to FIG. 5, the target register is then reserved (box 507). Next, the number of sectors required to be used for the operand is determined (box 509). Next, it is determined (box 511) is the target is architected register's sector is being used per the Sector Status Table 317. It is noted that only the least significant sector is used for the architected register's used in an instruction and the remaining sectors are used for renaming. If the target architected register's sector is not being used, then the process continues to set status bits of the sectors to be used (box 519). If the target architected sector is being used (box 51 1), then it is determined (diamond 512) if there is any outstanding instruction (01) using the register. If not, the value is moved to a rename sector, the status bit is cleared (box 514), and the process continues to set status bits (box 519). If (diamond 512) there is an outstanding instruction using the register, then it is determined if the architected or rename register sector is available (box 513). If the sector is not available (box 513), the process stalls issuance of the instruction (box 515) until it becomes available. If the architected or rename register is available (box 513), then the Rename Table 313 is updated (box 517) with the register number 331, instruction address 333 and Rename Register plus sector mask 335 (shown in FIG. 3) prior to setting the status bits of the sectors to be used (box 519). After setting the status bits (box 519), the instruction is issued (box 521) and executed (box 523). If the data value to be stored in the register is negative, the sign extend bit 337 is set (box 525) and the value is written back to the register sectors (box 527) as the process ends (box 529).

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and included or integrated into a processor or CPU or other larger system integrated circuit or chip. The methodology may also be implemented solely in program code stored on a compact disc (CD), disk or diskette (portable or fixed), or other memory or storage device, from which it may be executed to function as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for accessing frequently used values in an information processing system, said information processing system including a main memory and at least one processor coupled to said main memory, said at least one processor further including a plurality of processor registers, said method comprising:

dividing at least one of said processor registers into a plurality of individually addressable sectors;

storing at least one frequently used value in at least one of said sectors;

establishing a buffered value memory device for holding values stored in said sectors;

checking said buffered value memory device for a value requested by said at least one processor; and retrieving said requested value from a sector containing said requested value;

wherein said buffered value memory device comprises a look-up table.

2. A method for accessing frequently used values in an information processing system, said information processing system including a main memory and at least one processor coupled to said main memory, said at least one processor further including a plurality of processor registers, said method comprising:

dividing at least one of said processor registers into a plurality of individually addressable sectors;

storing at least one frequently used value in at least one of said sectors establishing a buffered value memory device for holding values stored in said sectors;

checking said buffered value memory device for a value requested by said at least one processor;

retrieving said requested value from a sector containing said requested value; and retrieving said requested value from said main memory when it is determined that said requested value is absent from said buffered value memory device;

wherein said buffered value memory device comprises a look-up table.

3. A method for processing instructions by at least one processor, said at least one processor including a plurality of processor registers, at least one of said processor registers being divided into a plurality of separately addressable sectors, said method comprising:

decoding an instruction for processing;

checking a memory device to determine whether a requested value is present in one of said sectors;

accessing said requested value from one of said sectors containing the requested value; and nullifying said instruction;

wherein said checking the memory device to determine whether a requested value is present is accomplished by using a frequently used value memory index to determine whether there is a match between an effective address associated with said instruction and the one of said sectors containing the requested value.

4. A processing unit comprising:

at least one register file comprising at least one register divided into a plurality of individually addressable sectors, wherein at least one predetermined sector stores common values frequently used by the processing unit;

a first memory device for storing sector-related indicia that is representative of predetermined characteristics of said sectors; and a second memory device storing references to the common values frequently used by said processing unit, wherein the second memory device is checked for a value requested by the processing unit to determine whether the requested value is present in one of the sectors.

5. The processing unit of claim 4, wherein the first memory device is a sector status table.

6. The processing unit of claim 4, wherein the second memory device is a lookup table.

7. The processing unit of claim 5, wherein the second memory device is a lookup table.

* * * * *